United States Patent

Haas et al.

Patent Number: 5,220,301
Date of Patent: Jun. 15, 1993

[54] SOLENOID WINDING CASE AND PROTECTIVE OVERMOLD AND METHOD OF MAKING

[75] Inventors: Albert L. Haas, Cass City, Mich.; Heiner W. Louis, Hillarys; Chris N. Sayer, Ferndale, both of Australia

[73] Assignee: Orbital Walbro Corporation, Cass City, Mich.

[21] Appl. No.: 736,252

[22] Filed: Jul. 26, 1991

[51] Int. Cl.⁵ .................................... H01F 7/00
[52] U.S. Cl. .................... 335/278; 335/260; 335/292
[58] Field of Search .................. 335/131–132, 335/126, 260, 261, 262, 245, 251, 278, 292

[56] References Cited

U.S. PATENT DOCUMENTS

| | | | |
|---|---|---|---|
| 4,185,163 | 1/1980 | Schedele | 335/202 |
| 4,322,037 | 3/1982 | Yamanaka et al. | 335/255 |
| 4,554,522 | 11/1985 | Minks | 335/202 |

Primary Examiner—Lincoln Donovan
Attorney, Agent, or Firm—Barnes, Kisselle, Raisch, Choate, Whittemore & Hulbert

[57] ABSTRACT

A solenoid winding and housing for use with an armature actuated fuel poppet valve and the process of applying interior and external annular plastic shields on and in the housing to seal against moisture and fuel and to provide joint and weld protection. A prong housing for the solenoid winding ends is molded along with the exterior molded shields. Noise insulation as well as protection of parts is provided with the molded shields.

4 Claims, 2 Drawing Sheets

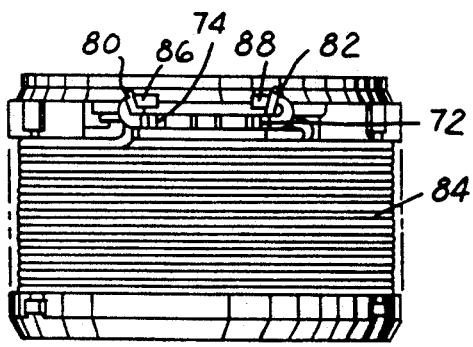
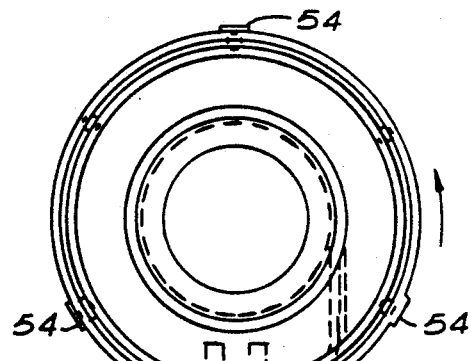
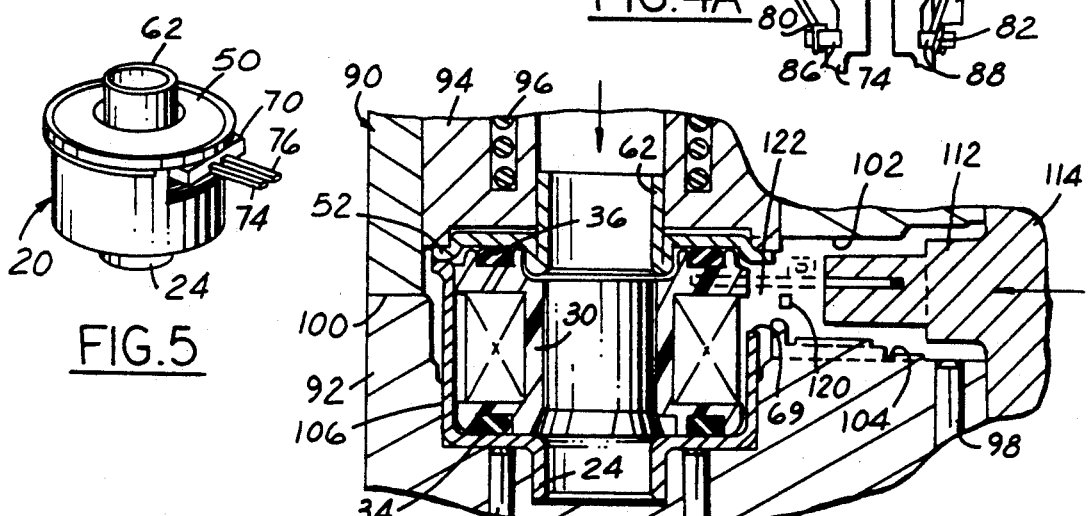
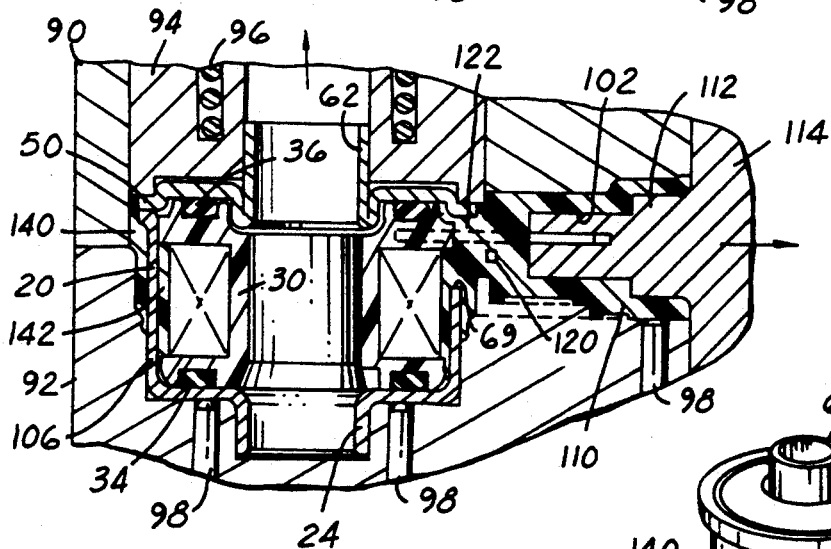
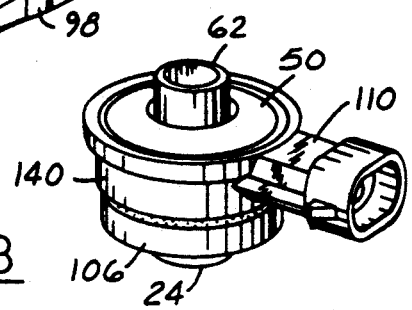

SOLENOID WINDING CASE AND PROTECTIVE OVERMOLD AND METHOD OF MAKING

FIELD OF INVENTION

Delivery of fuel to internal combustion engines, in particular, delivery of a fuel and air mixture directly to operating pistons using a solenoid actuated poppet valve suitably timed for proper combustion.

BACKGROUND AND FEATURES OF THE INVENTION

Much development work has been done in connection with delivery fuel to internal combustion engines, in particular in recent years, the delivery of combustible fuel and gas, especially air, in metered quantities. Much of the work has centered around the delivery of a fuel mixture to two-cycle, spark ignition engines. U.S. Pat. No. 4,693,224 (Sep. 15, 1987) and U.S. Pat. No. 4,825,828 (May 2, 1989) illustrate and describe the problems of fuel injection and the advantages of direct in-cylinder injection which is effective in operation, economic to manufacture and achieves and maintains acceptable atomization of the fuel.

The present invention is specifically directed to spark ignited, internal combustion engines where a premetered quantity of fuel is entrained in a gas, conveniently air, and the fuel entrained in the gas is delivered directly into the combustion chamber of the engine through a nozzle which is intermittently opened. This is achieved by the use of a poppet valve which is controlled and moved axially to open and closed positions using an electromagnetic coil and an armature closely associated with the poppet valve. Each cylinder, in a multi-cylinder engine, is provided with a fuel and air nozzle injection assembly.

The present invention is directed to the construction of the solenoid which is used to actuate the poppet valve. The solenoid bobbin assembly is housed in a case and cover. It is known to mold plastic simultaneously externally and internally of the solenoid assembly and some of the problems in connection with this involve the pressure and heat needed. This may result in winding bobbin distortion which may cause seal failures. Another problem lies in the possibility of plastic resin flowing to areas where it cannot be tolerated or allowing fuel leakage past the seals to the outside of the injector.

Other manufacturers of fuel injectors have used injection molding into the solenoid assembly by leaving an end of the solenoid open so that when inserted into the mold, the mold can be used as a back-up for the bobbin to prevent distortion and to prevent mold material from flowing into areas where it cannot be tolerated.

The present invention is directed to a combination of an internal and external molding process which is accomplished without any internal mold support for the solenoid bobbin assembly. With the proposed process, damage to critical areas of the solenoid case and cover is avoided by eliminating the use of a support mandrel.

Other objects and features of the invention will be apparent in the following description and claims in which the principles of the invention are set forth together with details to enable persons skilled in the art to practice the invention, all in connection with the best mode presently contemplated for the invention.

BRIEF DESCRIPTION OF THE INVENTION

The invention consists of the process of internal and external injection molding and the resulting structure in regard to a solenoid bobbin assembly and housing to provide external surround walls outside a solenoid case and also internal plastic walls which enclose the outside of a bobbin assembly while at the same time creating a plug extension housing for electrical prongs to conduct energy to the solenoid winding. The external walls protect the weld joints between a solenoid case and cover from oxidizing. The internal walls outside the bobbin assembly protect the winding from water intrusion and provide insulation as well as a sound barrier for a poppet valve in the housing.

BRIEF DESCRIPTION OF THE DRAWINGS

DRAWING accompany the disclosure and the various views thereof may be briefly described as:

FIG. 4, an elevation of a solenoid bobbin assembly showing the connection prongs and the winding ends affixed;

FIG. 4A, a top view of the solenoid bobbin assembly.

FIG. 5, a perspective view of a solenoid housing assembly prior to the molding treatment;

FIG. 6, a sectioned view of the solenoid housing within an enclosing mold prior to injection of mold material;

FIG. 7, a sectioned view similar to FIG. 6 subsequent to the plastic injection;

FIG. 8, a perspective view of a complete solenoid with the interior and exterior overmold.

DETAILED DESCRIPTION OF THE INVENTION AND THE MAKING AND THE MANNER AND PROCESS OF USING IT

Figure 1:
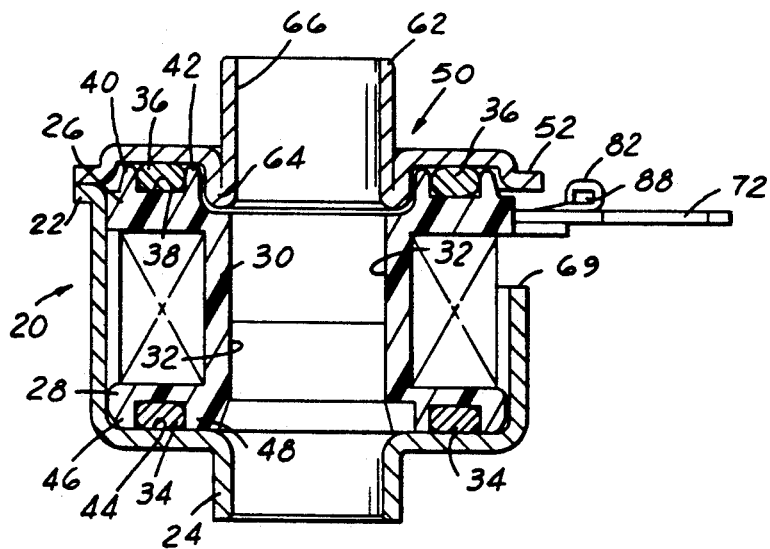
FIG. 1, a sectional view of a solenoid assembly with no overmold.
Figure 2:
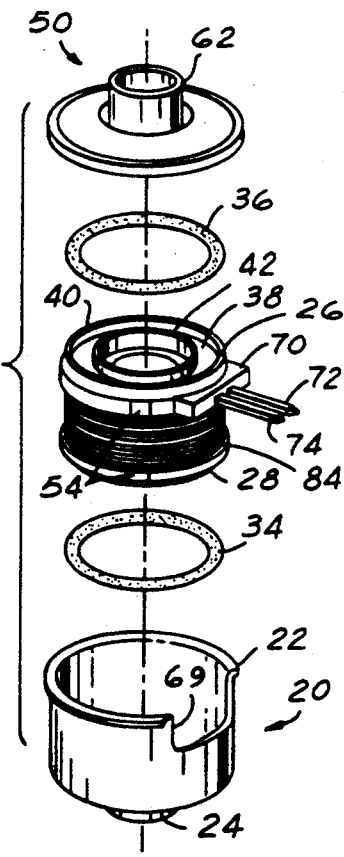
FIG. 2, an exploded view of a solenoid assembly illustrating the various parts.
Figure 3:
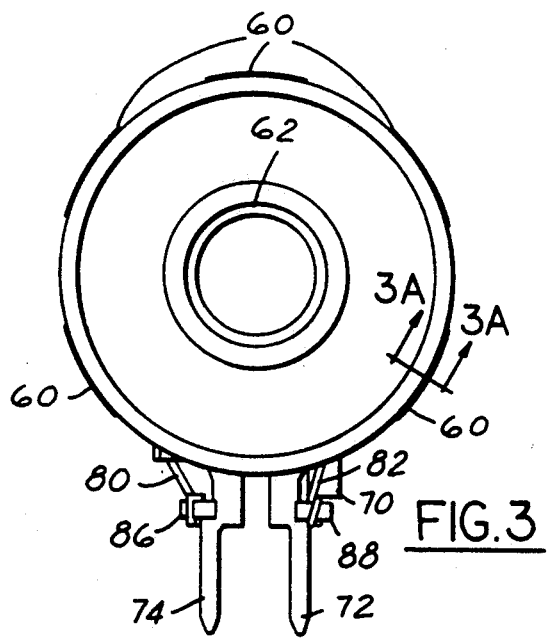
FIG. 3, a top view of the solenoid assembly without the mold material.
Figure 3A:
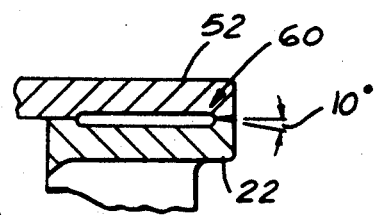
FIG. 3A, a section on line 3A—3A of FIG. 3.

In FIGS. 1 and 3, details of the solenoid assembly are illustrated. A cup-like case 20 has an upper outer flange 22 and a bottom projecting collar 24. This collar fits into the head of the engine. A solenoid winding bobbin has an upper land 26 and a lower land 28 connected by a cylindrical core 30 having a central passage 32. Each land 26 and 28 has an O-ring groove for O-rings 34 and 36. O-ring 36 is in a groove 38 which has annular container ridges 40 and 42. O-ring 34 fits in a groove 44 which has containment ridges 46 and 48. Each land 26 and 28 has three tabs projecting outward at circumferentially spaced locations 54 (FIGS. 2 and 4A). The tabs 54 centrally locate and create an interference fit of the solenoid bobbin assembly 84 in case 20. A solenoid cover 50 has an outside dropped flange 52 which is stitch welded to the flange 22 of the case at circumferentially spaced locations as shown in FIG. 3 at 60. A sectional view on line 3A—3A of FIG. 3 shows a weld 60. These spaced welds 60 allow the escape of air between the welds when a molding process is proceeding.

The solenoid cover 50 has also a central neck portion 62 rising from a reverse fold 64 in the central cover. Thus, the collar 24, the core opening 32 and the neck 62 provide a cylindrical passage 66 through the solenoid in which is located a fuel poppet valve (not shown).

At one side of the bobbin 26,28,30, projecting through a window 69 in the side of case 20, is a projection 70 carrying connector pins 72,74. As shown in FIGS. 4, 4A and 5, the ends 80,82 of a solenoid wire winding 84 on the bobbin 26,28,30 are illustrated as wound around lugs 86,88, respectively, at the root of the connector pins 72,74. These elements make up the solenoid bobbin assembly.

Now that the various elements of the solenoid assembly are described, we turn to the molding process which is called "overmold". It consists of placing the assembled solenoid into an outer enclosing mold which has a top mold 90 and a bottom mold 92 as shown in FIGS. 6 and 7. The top mold 90 has a spring-loaded top shut-off plunger 94 backed by a coil spring 96. This plunger bears against the outer flange 52 of solenoid cover 50. The lower mold 92 has ejector pins 98 and a circumferential bottom shut-off fit at 106. The parting line for the molds is at 100.

On the right side of the combined molds are opposed recesses 102 in the top mold 90 and 104 in the bottom mold 92 which together provide a mold recess to shape the projection 110 (FIG. 8) on the side of the finished product. Into the recess is projected a core insert 112, on a slide mount 114, which will be positioned between the mold parts 90 and 92 during the molding process.

In FIGS. 6 and 7, a mold gate opening 120 is provided in mold part 92 which has continuity to a window access 122 at window 69 which allows plastic resin to flow around the bobbin assembly of the solenoid winding. The illustration in FIG. 6 shows the solenoid assembly within the mold parts 90 and 92, and the core 112 in position for the injection mold process.

With the parts as shown in FIG. 6, a pressurized injection of a flowable plastic resin is introduced through the gate area 120 and the window area 122. This injection is done very rapidly and the material flows under pressure into all accessible spaces inside and outside the solenoid assembly. In FIG. 7, the cross-hatching which is angling up and to the left indicates the plastic resin in the completed overmold process.

After the mold injection is completed, the core 112 and the slide mount 114 are pulled from the right side of the mold, and the molds 90 and 92 parted. The ejector pins 98 are actuated and the completed part is removed. With reference to FIGS. 7 and 8, the completed part shows an outer band of plastic 140 molded integrally with the connection socket 110. Inside the wall of the case 20 is a ring of plastic 142 which may extend, in part, up to and down to the O-rings 36 and 34. However, the O-rings block any passage of the plastic to the passage 66 inside of the solenoid bobbin assembly. The plastic flows around the bobbin assembly and is blocked on each side of the interior by the O-rings. The interior plastic ring 142 is integrally merged with plug extension 110 at the window area 69 and joining portion at 122 (FIG. 6). Thus, the extension 110 containing the contact prongs 72,74 is rigidly secured and locked to the solenoid case 20 by the bottom and side edges of the window 69.

As previously indicated, air in the assembly will be forced out of the case during the plastic injection through gaps between the stitch welds 60 around the solenoid case 20 and cover 50. The internal plastic 142 serves as an insulation and moisture seal as well as a sound barrier. The outer annular sheath 140 seals and covers the joint between the solenoid case 20 and the cover 50 and protects against oxidation, provides a moisture seal, and aids in strengthening the extension 110.

It will be see that this interior and external plastic mold process is accomplished without any internal mandrel and thus the surfaces within the neck 62, the bobbin passage 30 and the collar 24 are not subject to damage in the molding process.

What is claimed as new is as follows:

1. A method of introducing and surrounding a solenoid assembly for housing a fuel dispensing poppet valve which comprises:
    (a) providing a solenoid case in cup form and a cover welded to said case with a solenoid bobbin assembly within the case and cover,
    (b) providing an O-ring seal below and above the bobbin assembly inside said closed case and cover,
    (c) providing a side window in said case outside said O-rings,
    (d) enclosing said case and cover within a mold, and
    (e) injecting a self-setting plastic into said mold to flow around said case to enclose the outer wall of the case and the joint between the cover and the case and to flow into said case to surround the solenoid bobbin assembly up to the O-ring seals above and below the window.

2. A method as defined in claim 1 in which said bobbin assembly has side projecting electrical contact prongs,
    (a) providing a side cavity in said mold to surround said prongs,
    (b) installing a side core in said side cavity to enclose said prongs, and
    (c) flowing plastic in said injection step into said side cavity and around said core to provide a receptacle for a connector plug.

3. A solenoid assembly having a central passage for a poppet valve to be actuated by a solenoid which comprises:
    (a) a cup-shaped case for receiving a solenoid bobbin assembly and having a side opening,
    (b) a cover for enclosing the top of said case, said case and said cover having external flanges secured together,
    (c) a solenoid bobbin assembly inside said case and cover having co-axial annular grooves facing, respectively, the inside of said cover and the inside of the bottom of said cup, and having wall clearance inside said case,
    (d) O-ring seals disposed at the top and the bottom of said bobbin assembly respectively in said annular grooves, and
    (e) a plastic sealing coating distributed inside and outside said assembly disposed on the outside of said cup-shaped case below and up to and around said external flanges on said case and cover, and disposed internally of said case and cover around said bobbin and up to the said O-ring in the top of said bobbin and down to the O-ring at the bottom of said bobbin, and filling the side opening in said cup-shaped case.

4. A solenoid assembly as defined in claim 3 in which said bobbin has connection prongs extending radially from said side opening and a prong enclosure molded integrally with said sealing coating extending around said prongs to serve as a receptacle for an electrical connection.

* * * * *